March 2, 1954  A. E. DENTLER  2,670,949
FRICTION SHOCK ABSORBER FOR RAILWAY CAR TRUCKS
Filed June 20, 1952  3 Sheets-Sheet 1

Inventor:
Arnold E. Dentler.
By Henry Fuchs
Atty.

March 2, 1954     A. E. DENTLER     2,670,949
FRICTION SHOCK ABSORBER FOR RAILWAY CAR TRUCKS
Filed June 20, 1952     3 Sheets-Sheet 2
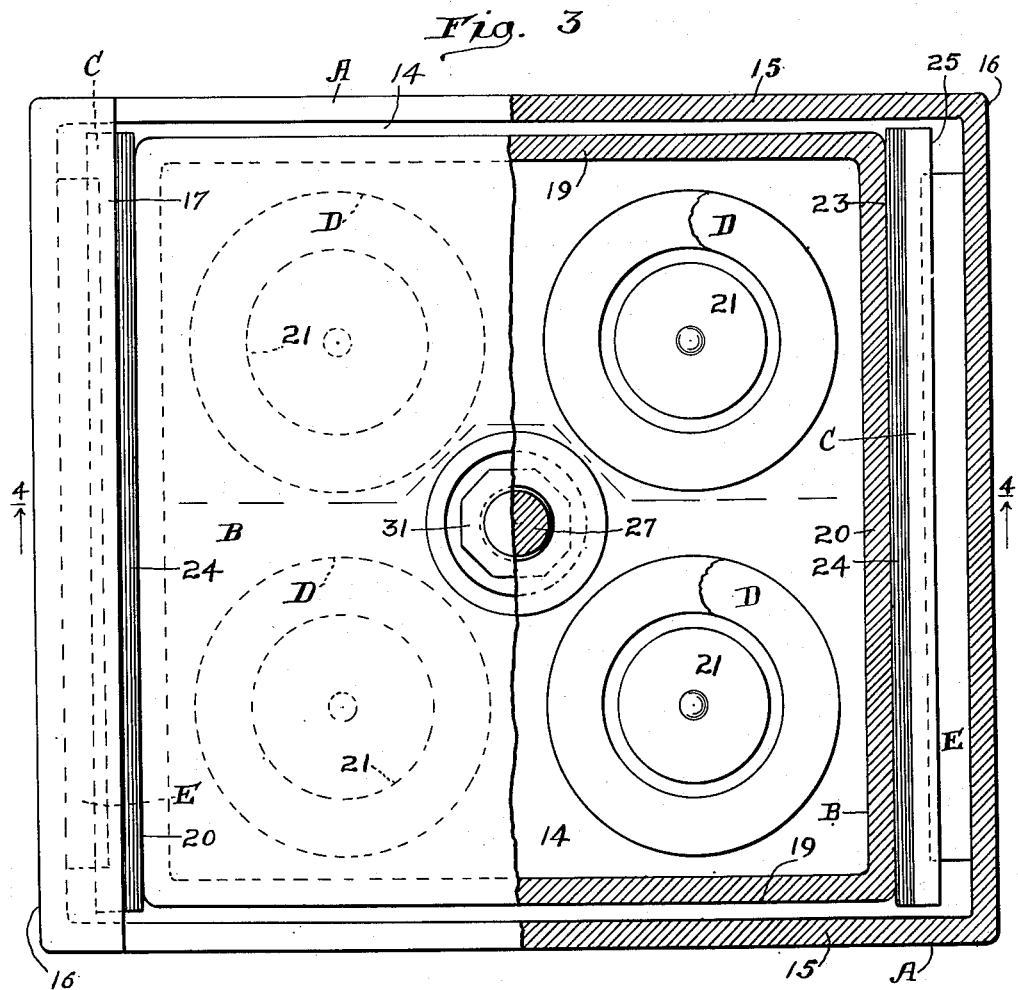
Inventor:
Arnold E. Dentler.
By Henry Fuchs
Atty.

March 2, 1954  A. E. DENTLER  2,670,949
FRICTION SHOCK ABSORBER FOR RAILWAY CAR TRUCKS
Filed June 20, 1952  3 Sheets-Sheet 3
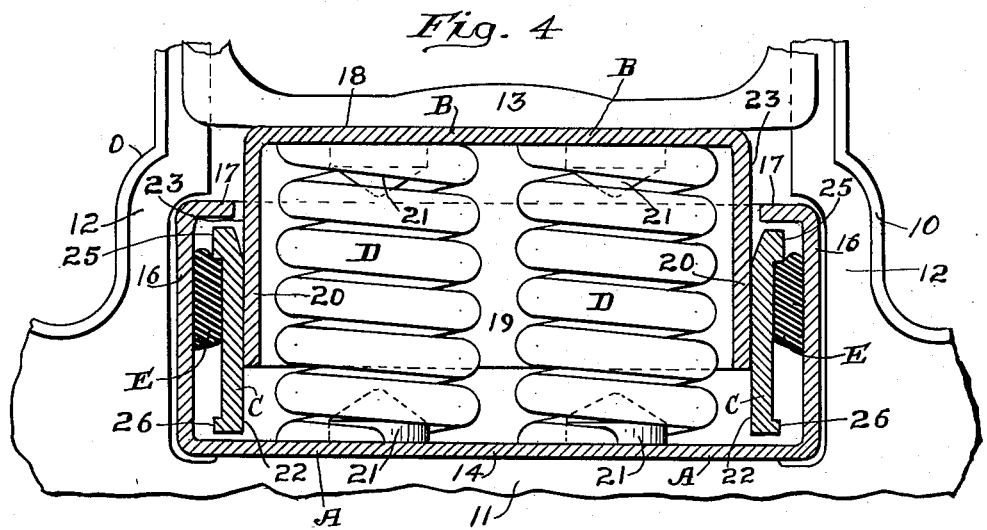
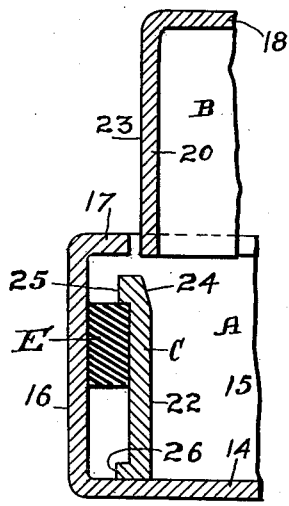
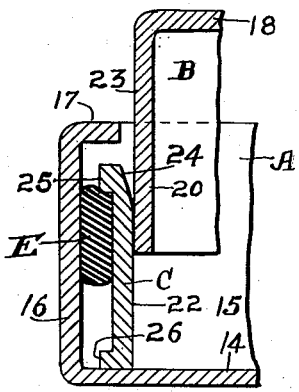
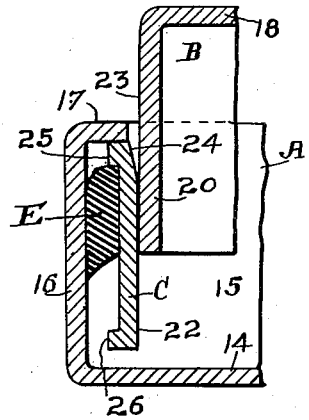
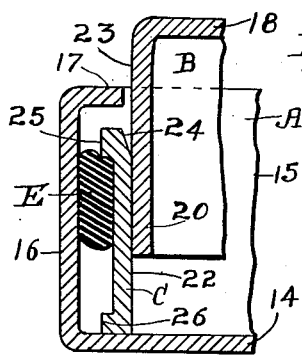
Inventor:
Arnold E. Dentler.
By Henry Fuchs
Atty.

Patented Mar. 2, 1954

2,670,949

UNITED STATES PATENT OFFICE 2,670,949

FRICTION SHOCK ABSORBER FOR RAILWAY CAR TRUCKS

Arnold E. Dentler, Western Springs, Ill., assignor to W. H. Miner, Inc., Chicago, Ill., a corporation of Delaware Application June 20, 1952, Serial No. 294,550

1 Claim. (Cl. 267—9)

This invention relates to improvements in friction shock absorbers employed in railway car trucks.

One object of the invention is to provide a simple and efficient shock absorber including load supporting springs, which is particularly adapted for use in connection with railway car trucks, and which provides light dampening action for the car truck supporting springs to take care of slight vibrations, and provides frictional resistance for dampening the action of the truck springs under heavier impacts.

A more specific object of the invention is to provide a shock absorber of the character indicated comprising relatively movable friction members having sliding frictional contact with each other, helical coil springs yieldingly opposing relative approach of said members, and rubber cushioning means under compression for forcing the friction members against each other, wherein preliminary light action is provided, followed by heavier frictional resistance as the compression increases, the light action being effected by the compression of the springs without relative movement of the friction members, and the heavier action being produced by relative movement of said friction members opposed by the springs, and wherein the rubber cushioning means is arranged to dampen the light preliminary spring action and thus eliminate excessive vibrations of the springs ordinarily encountered while cushioning light impacts delivered to the same.

Other objects of the invention will more clearly appear from the description and claims hereinafter following.

In the accompanying drawings forming a part of this specification,

Figure 3 is a part top plan view and part horizontal sectional view, corresponding substantially to the line 3—3 of Figure 1.

Figure 4 is a vertical sectional view on the line 4—4 of Figure 3, illustrating the shock absorber applied to the truck of a railway car.

Figure 1:
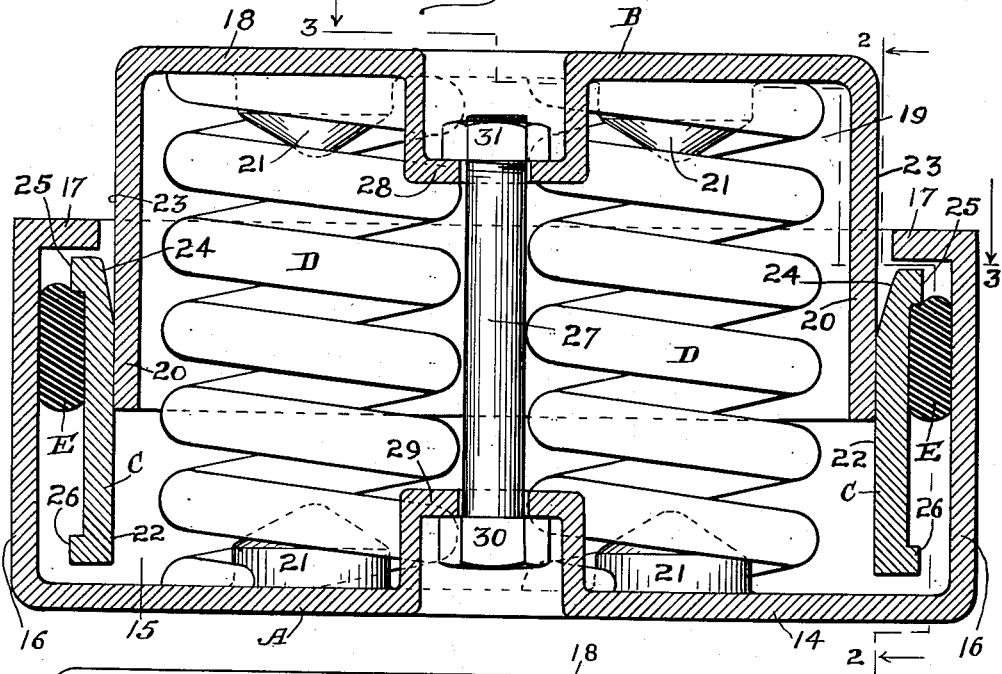
Figure 1 is a vertical sectional view of my improved shock absorber.
Figure 2:
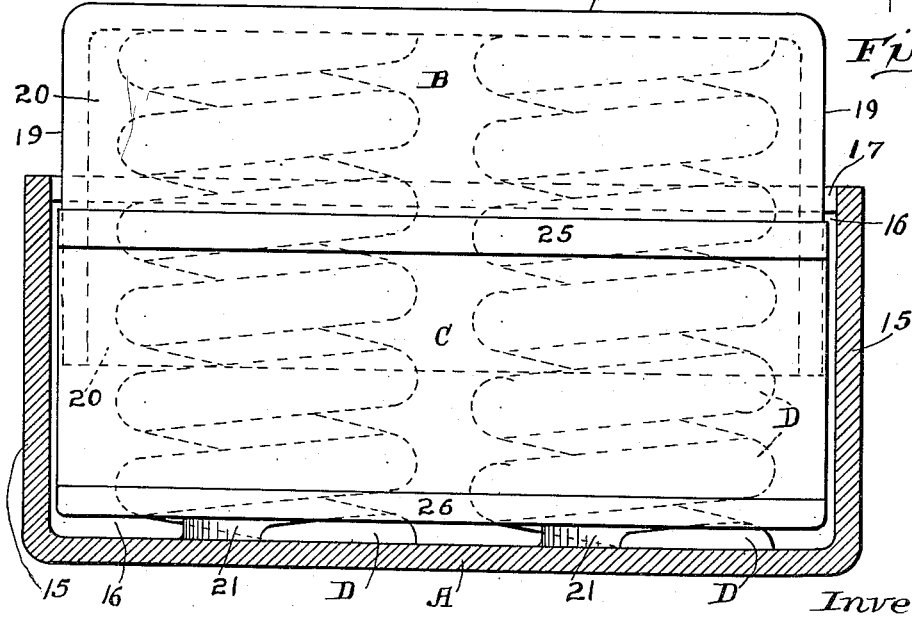
Figure 2 is a transverse vertical sectional view, corresponding substantially to the line 2—2 of Figure 1.

Figures 5, 6, 7, and 8 are broken views similar to Figure 1, showing the left hand end portion of the shock absorber and illustrating the manner of assembling the same.

In Figure 4 of the drawings, which illustrates my improved shock absorber applied to a railway car truck, 10 indicates one of the side frame members of the truck. The side frame member 10 is in the form of a casting and has the usual top and bottom members, connected by vertical sections, the bottom member being indicated by 11 and the side sections by 12—12, the top member not being shown. The side sections 12—12 form guides for the usual truck bolster, which is indicated by 13. As will be understood by those skilled in this art, the truck includes two side frame members 10—10 and the truck bolster 13, which has its opposite ends guided between the vertical sections 12—12 of the side frame and is supported by my improved shock absorber, instead of the usual arrangement of truck springs.

My improved shock absorber as illustrated in the drawings comprises broadly a casing A, a friction cap B, two friction shoes C—C, four helically coiled springs D—D—D—D, and two rubber pads E—E.

The casing A is in the form of a rectangular boxlike structure open at the top and having a horizontal bottom wall 14, vertical side walls 15—15, and vertical end walls 16—16. The end walls 16—16 are provided with inturned horizontal top flanges 17—17, which overhang the friction shoes C—C, as seen in Figures 1 and 4 to 8 inclusive.

The friction cap B is also of rectangular outline, is open at the bottom, and has a horizontal top wall 18, and depending vertical side and end walls 19—19 and 20—20. The friction cap fits freely within the opening of the casing A and is vertically movable with respect to the latter.

The friction cap B is yieldingly supported in the casing A by the helically coiled springs D—D—D—D, which correspond to the usual truck springs. The springs D have their top and bottom ends bearing respectively on the underneath side of the wall 18 of the cap B and the top side of the bottom wall 14 of the casing A. Centering bosses 21—21 for the springs D are preferably provided on the wall 18 of the cap B and the wall 14 of the casing A.

The friction shoes C—C are arranged at opposite ends of the casing A between the end walls 20—20 of the cap B and the end walls 16—16 of the casing A. Each shoe C has a flat vertically disposed friction surface 22 on its inner side which engages a flat vertical friction surface 23 provided on the outer side of the corresponding end wall 20 of the cap B. At the upper end, each shoe C has the inner side beveled off, as indicated at 24, to facilitate assembling of the mechanism. On the outer side, each shoe has relatively shallow top and bottom flanges 25 and 26, as seen in Figures 1 and 4 to 8 inclusive. As shown, the shoes C—C are of lesser height than the vertical dimensions of the casing between the bottom wall 14 and the flanges 17, thus providing a certain amount of clearance at the top and bottom ends of the shoes.

The rubber pads E—E are interposed between the shoes C—C and the end walls 16—16 of the casing A. Each of the pads E is in the form of an elongated mat or strip vulcanized to the corresponding shoe C. These rubber pads are under compression between the shoes C and the walls 16 of the casing and press the shoes into tight frictional contact with the friction surfaces 23 of the friction cap B. As shown in Figures 1 and 4, the pads E are shorter in height than the shoes C and are located at the upper ends of the latter.

The cap B and the casing A are connected by a retainer bolt 27 having its opposite ends engaged in inwardly projecting, hollow bosses 28 and 29 on the wall 18 of the cap B and the wall 14 of the casing A. The head of the bolt, which is indicated by 30, and the nut, which is indicated by 31, have shouldered engagement with the bosses 29 and 28, respectively, to limit vertical separation of the casing A and the cap B and hold the shock absorber assembled.

In assembling the shock absorber, the shoes C—C with the pads E—E attached thereto are first inserted within the casing A and positioned at opposite ends of the same, as illustrated in Figure 5. The springs D—D—D—D are then placed in position within the casing. Next the cap B is placed over the springs D—D—D—D and forced into the casing between the shoes C—C, as shown in Figure 6, and then depressed to the position shown in Figure 7. After the pressure is removed, the springs return the parts to the positions shown in Figure 8. The retainer bolt 27 is then applied to connect the cap B and the casing A and limit vertical separation of these members.

In the normal positions of the parts of the shock absorber, when arranged within the side frame 10 of the car, with the truck bolster 13 supported thereon, the upper and lower ends of the shoes C—C are spaced from the bottom wall 14 and the flanges 17 of the casing A, as shown in Figure 4, whereby under slight impacts the shoes C—C are movable up and down to a limited extent without frictional opposition, being resisted only by the action of the rubber pads E and the springs D. This takes care of vibrations due to light impacts, the rubber pads acting to dampen the action of the springs, thus materially reducing the frequency of the vibrations. Under heavier impacts, that is, upon greater movement of the friction cap B with respect to the casing A, the clearance between the ends of the shoes C—C and the stops formed by the bottom wall 14 and the flanges 17 of the casing A is taken up, and further movement of the shoes with respect to the casing arrested, thereby forcing the cap B to slide on the shoes to produce high frictional resistance to snub or dampen the action of the springs D under heavier impacts.

I claim:

In a friction shock absorber, the combination with a casing having a bottom wall and spaced vertical end walls; of inturned stop flanges on said end walls at the upper ends thereof; friction shoes at opposite ends of said casing, said shoes having their opposite ends spaced from said bottom wall and stop flanges, respectively, and adapted to engage therewith to arrest movement of said shoes with respect to the casing after a predetermined compression of the mechanism less than the full compression stroke thereof; a friction cap slidingly engaged between said shoes for movement in a vertical path, said cap and shoes having cooperating friction surfaces; springs within the casing yieldingly supporting said cap; and rubber pads within said casing, said pads being interposed between said shoes and the end walls of the casing, said pads being vulcanized to said shoes and being under lateral compression between said shoes and casing end walls.

ARNOLD E. DENTLER.

References Cited in the file of this patent

UNITED STATES PATENTS

| Number | Name | Date |
|---|---|---|
| 2,265,392 | Olander | Dec. 9, 1941 |
| 2,277,263 | Tucker | Mar. 24, 1942 |
| 2,295,554 | Cottrell | Sept. 15, 1942 |
| 2,295,556 | Flesch | Sept. 15, 1942 |
| 2,357,264 | Light | Aug. 29, 1944 |
| 2,370,107 | Light et al. | Feb. 20, 1945 |